(12) United States Patent
Kelly et al.

(10) Patent No.: US 8,353,639 B2
(45) Date of Patent: Jan. 15, 2013

(54) TURNBUCKLE LOCK

(75) Inventors: Francis Joseph Kelly, Polk City, IA (US); Anthony Scott Royer, Minburn, IA (US); James Franklin Bierl, West Des Moines, IA (US)

(73) Assignee: Deere & Company, Moline, IL (US)

( * ) Notice: Subject to any disclaimer, the term of this patent is extended or adjusted under 35 U.S.C. 154(b) by 2037 days.

(21) Appl. No.: 11/282,323

(22) Filed: Nov. 18, 2005

(65) Prior Publication Data
US 2007/0116510 A1 May 24, 2007

(51) Int. Cl.
*F16B 7/06* (2006.01)

(52) U.S. Cl. .......................................... 403/46

(58) Field of Classification Search ............ 403/22, 403/43, 44, 46, 112, 116, 232.1, 233, 235
See application file for complete search history.

(56) References Cited

U.S. PATENT DOCUMENTS

| | | | |
|---|---|---|---|
| 1,411,279 A | 4/1922 | Jaynes | 403/46 |
| 2,648,997 A | 4/1950 | Sawyer | 74/586 |
| 2,845,288 A | 2/1954 | Cierpik, Jr. | 403/46 |
| 2,878,043 A | 3/1959 | Edman et al. | 403/46 |
| 2,929,458 A | 3/1960 | Cole | 172/446 |
| 3,582,118 A * | 6/1971 | Hogan et al. | 403/320 |
| 3,806,265 A * | 4/1974 | Hattan | 403/46 |
| 3,851,978 A | 12/1974 | Kuipers | 403/45 |
| 3,927,634 A * | 12/1975 | Stoerring | 114/108 |
| 5,765,957 A | 6/1998 | Connell | 403/46 |
| 5,947,504 A * | 9/1999 | Milazzo | 280/457 |
| 6,056,069 A | 5/2000 | Hagen et al. | 172/679 |
| 6,109,814 A * | 8/2000 | Cox et al. | 403/61 |
| 6,386,571 B1 * | 5/2002 | Vollmer et al. | 280/455.1 |
| 6,609,575 B1 | 8/2003 | Crabb | 172/439 |
| 6,655,468 B2 * | 12/2003 | Casali et al. | 172/439 |
| 6,902,342 B1 | 6/2005 | Ditzler | 403/78 |

* cited by examiner

*Primary Examiner* — Joshua Kennedy

(57) ABSTRACT

A lock for an implement turnbuckle includes an apertured plate attached directly to the turnbuckle. The plate receives the pin or linkage connecting structure that attaches to the threaded eyebolt of the turnbuckle. The mounting end of the plate opposite the slot is secured against a flat on the internally threaded member of the turnbuckle by a U-bolt. The plate prevents relative rotation between the eyebolt and an internally threaded member receiving the eyebolt to thereby maintain the desired turnbuckle length adjustment.

11 Claims, 1 Drawing Sheet

TURNBUCKLE LOCK

FIELD OF THE INVENTION

The present invention relates generally to agricultural implements and, more specifically, to locking structure for an implement turnbuckle.

BACKGROUND OF THE INVENTION

Numerous implements include a turnbuckle to adjust height or relative position of structures. Field cultivators and chisel plows, for example, employ several turnbuckles for leveling adjustments. Such agricultural implements as well as industrial equipment and the like are subjected to extremely heavy loading and rugged environmental conditions, and maintaining proper adjustment of the turnbuckle has been problematic. Present locking arrangements include jam nuts, double nuts and special locking washers and nuts which are not always effective or reliable in preventing an eyebolt portion from rotating relative to the turnbuckle. Providing adequate torque on locking nut arrangements is difficult, especially when the turnbuckle adjustments have to be made in the field or at the worksite. When the locking nut works loose, the body of the turnbuckle rotates relative to the eyebolt portion and causes turnbuckle length changes which adversely affect machine adjustments.

Other turnbuckle lock arrangements include flip-over structure for capturing the adjusting nut. However, mounting the flip-over structure has been a problem on round turnbuckles that do not provide a fastening location. In locations having limited space, the turnbuckle lock arrangements can be difficult to mount and operate.

Often, a turnbuckle is designed to fit either side of the assembly to which it is connected, and therefore the locking device must be accessible and operable from both sides. Securing any locking device adequately to resist the heavy forces that can be transmitted through adjusting nut on the turnbuckle continues to be a source of difficulty.

SUMMARY OF THE INVENTION

It is therefore an object of the present invention to provide an improved turnbuckle lock for an implement. It is another object to provide such a structure which overcomes most or all of the aforementioned problems.

It is a further object of the present invention to provide an improved turnbuckle lock that prevents turnbuckle rotation. It is another object to provide such a lock that eliminates need for high torque jam nuts or special locking washers, locking nuts, or pins. It is yet another object to provide such a lock that facilitates adjustments using ordinary hand tools without need for high torque wrenches.

It is another object to provide an improved turnbuckle lock mountable in either a right-hand or a left-hand turnbuckle offset. It is yet another object to provide such a structure which does not hinder turnbuckle adjustment and allows the implement to be easily adjusted to the proper position.

A turnbuckle lock for an implement includes an apertured plate attached at a mounting end directly to the threaded hex portion of the turnbuckle. An opposite slotted end receives the pin or connector that attaches to the eyebolt portion of the turnbuckle and prevents rotation of the plate. The mounting end is secured against a flat on the internally threaded hex member of the turnbuckle by a U-bolt to secure the turnbuckle against rotation. The plate can be easily mounted on either side of the turnbuckle and therefore is accessible and works equally well for either left or right offset turnbuckles. The slotted end of the plate accommodates adjustment of the turnbuckle to any position without interference. In an alternate embodiment, one or more apertures provided in the plate with U-bolt repositioning facilitate the length adjustments.

These and other objects, features and advantages of the present invention will become apparent in view of the description below taken with the drawings.

DESCRIPTION OF THE PREFERRED EMBODIMENT

Figure 1:
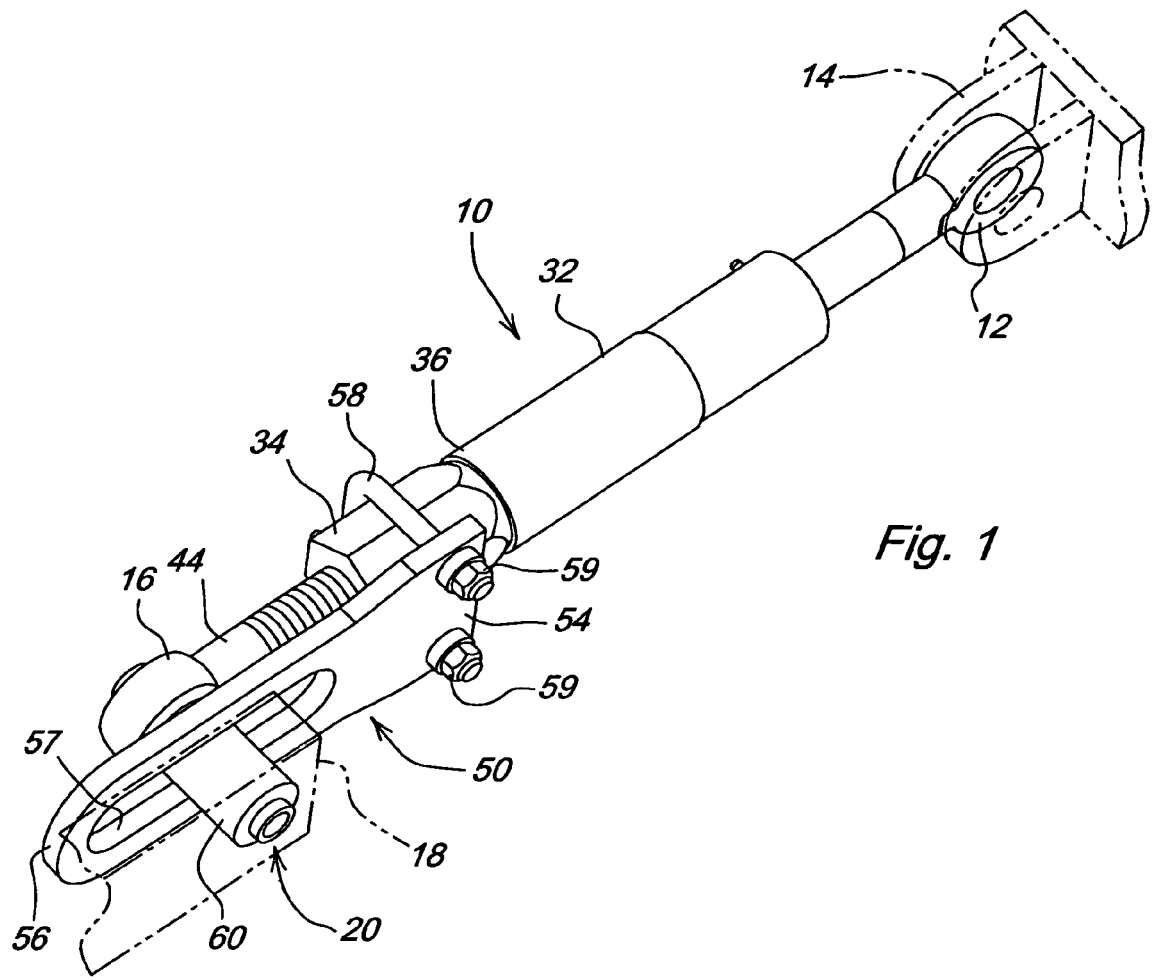
FIG. 1 is a perspective view of a turnbuckle with a turnbuckle locking arrangement.
Figure 2:
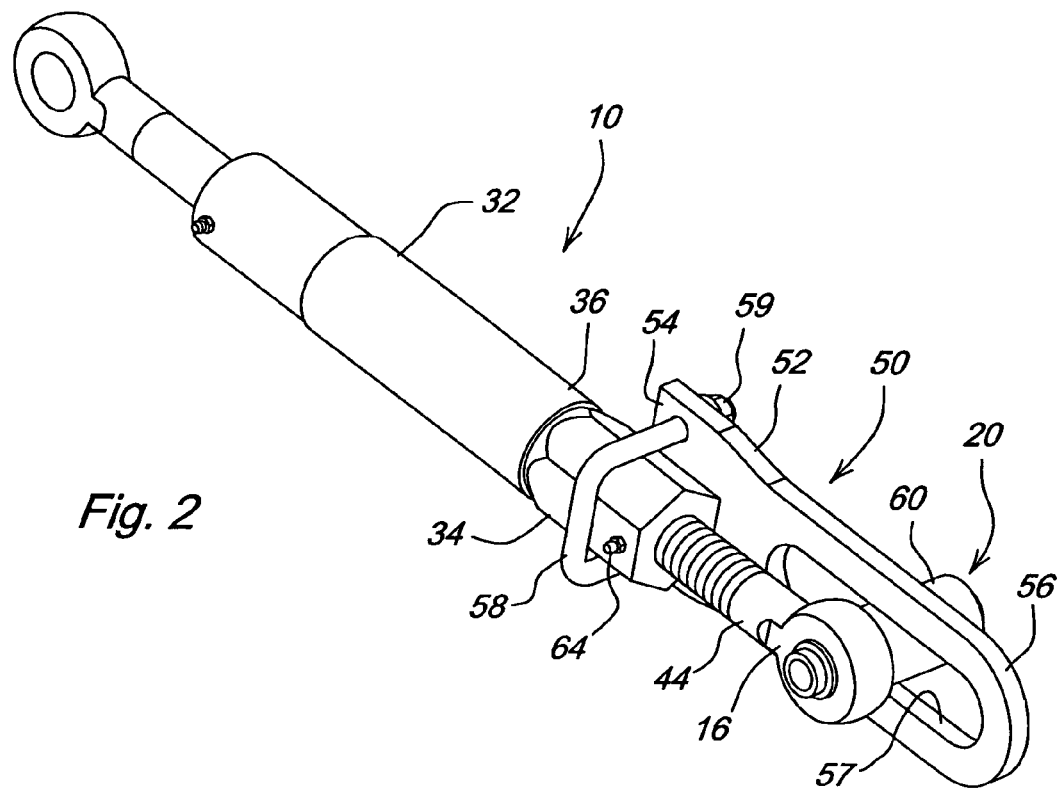
FIG. 2 is a perspective view of the turnbuckle of FIG. 1 taken from the opposite side of the turnbuckle.

Referring to FIGS. 1 and 2, therein is shown a turnbuckle 10 pivotally connected at a first eyebolt end 12 to an implement frame connection area 14 or other structure associated with the implement. A second eyebolt end 16 is pivotally connected to a linkage 18 or other structure by a turnbuckle connector or pin structure 20 secured to the eyebolt end 16. The length of the turnbuckle 10 is adjustable to vary the distance between the eyebolt ends 12 and 16 and thereby vary the position of the linkage 18 relative to the connection area 14. In one example, the linkage 18 is a leveling adjustment for a field cultivator or chisel plow.

The eyebolt end 12 is secured to one end of a central tubular body 32. An elongated, internally threaded nut or hex member 34 is secured to an opposite end 36 of the tubular body 32. The eyebolt end 16 includes a threaded rod portion 44 which is threaded into the hex member 34 and into the end 36. Length adjustment is achieved by rotating the eyebolt end 16 relative to the member 34. Previous locking arrangements included a lock nut or a lock nut and lock washer combination (not shown) tightened against the member 34 to secure the turnbuckle 10 in the adjusted length position. However, because of the extreme forces and harsh environmental conditions encountered by the turnbuckle 10, the lock nut often loosened and allowed relative rotation between the hex member 34 and the rod portion 44 so that the adjusted length position can not be held.

To secure the rod portion 44 and hex member 34 against relative rotation, locking plate structure 50 is provided. The locking plate structure 50 includes a slotted or apertured plate 52 having a connecting end 54 and an opposite slotted end 56 with an aperture or slot 57. The connecting end 54 is secured against a flat on the hex member 34 by a U-bolt 58 extending around the member and through apertures in the plate 52. Nuts 59 are tightened against the plate 52 to nonrotatably secure the plate to the member 34.

The slotted end 56 of the plate 52 receives the connector or pin structure 20 therethrough. The pin structure 20 as shown includes a cylindrical bearing surface or bushing 60 and is captured in the structure 18. The slot 57 provides a close but slidable fit with the bushing 60. Therefore, any rotation of the plate structure 50 relative to the pin structure 20 is resisted by contact between the bushing 60 and the upper and lower boundaries of the slot 57 as shown. With the pin structure 20 captured by the linkage 18, the plate 52 is held against rotation, and rotation of the eyebolt end 16 relative to the hex member 34 is prevented so the turnbuckle length cannot vary.

In operation, the length of the turnbuckle 10 is adjusted to provide the desired adjustment of the linkage 18 by rotating the hex member 34 relative to the eyebolt end 16 to thread the rod portion 44 into or out of the threaded bore in the hex member. Once the length is adjusted, the plate structure 50 is secured to a flat on the hex member 34 by tightening the nuts 59 on the U-bolt 58. Any forces tending to rotate the eyebolt end 16 relative to the hex member 34 are resisted by the contact of the boundary of the aperture 57 against the bushing 60 which is held by the linkage 18.

The thickness of the plate 52 is selected to provide resistance to twisting and to establish a good bearing surface contact area of the pin structure 20 against the surface of the slot 57. Although the aperture 57 is shown as a slot, other aperture arrangements such as one or more holes generally conforming to the shape of the pin structure or a plurality of U-bolt hole locations could also be used. The slot 57 accommodates a wide range of turnbuckle length adjustments for a given U-bolt location without need for disassembly of the pin structure or complete removal of the U-bolt 58 from the plate structure 50 during adjustments. Also, interference between the U-bolt 58 and a grease fitting 64 or other protrusion on the hex member 34 is easily avoided with the aperture arrangement.

With the plate structure 50 secured to the member 34, no jam nut or special lock washers are required to maintain an adjusted turnbuckle length. Although the pin structure 20 is shown in the figures as extending to the left-hand side of the turnbuckle 10, the pin structure 20 can be secured to the right-hand side with the plate structure 50 secured to the flat opposite the flat shown using the same components.

Having described the preferred embodiment, it will become apparent that various modifications can be made without departing from the scope of the invention as defined in the accompanying claims.

The invention claimed is:

1. Implement turnbuckle structure comprising:
   a first connecting end;
   a second connecting end including a threaded member received by a nut member and rotatable relative to the nut member vary the distance between the first and second connecting ends over a range of distances and thereby provide variable turnbuckle length;
   a connector extending from the second connecting end and secured to a linkage structure;
   a generally planar plate member having a mounting end releasably secured at a mounting location to the nut member and including an apertured end opposite the mounting end and receiving a portion of the connector therethrough, the apertured end and connector securing the threaded member against rotation relative to the nut member to prevent changes in turnbuckle length; and
   wherein the apertured end comprises a slot having a length on the order of the range and facilitating turnbuckle length adjustments substantially over the range independently of change of the mounting location.

2. The turnbuckle structure set forth in claim 1 wherein the nut member includes a flat abutting the plate member and further comprising a U-bolt securing the plate member against the flat.

3. The turnbuckle structure set forth in claim 2 wherein the nut member includes a protrusion, and wherein the apertured end selectively receives the connector at different locations along the apertured end to prevent interference between the U-bolt and the protrusion.

4. The turnbuckle as set forth in claim 3 wherein the protrusion comprises a grease fitting offset from the flat.

5. The turnbuckle as set forth in claim 1 wherein the connector includes a bushing and the slot includes a slot edge bearing against the bushing.

6. Implement turnbuckle structure comprising:
   a first end;
   a hex member connected to the first end;
   an eyebolt member having an eye end and threaded into the hex member, the eyebolt member rotatable relative to the hex member to adjust the distance between the first end and the eye end and change the turnbuckle length;
   a connector extending from the eye end and secured to a linkage structure, the linkage structure preventing rotation of the connector;
   a plate member having a mounting end adjustably secured to the hex member at an adjustable location along the hex member and including an apertured end opposite the mounting end receiving the connector, the plate member and connector securing the eyebolt member against rotation relative to the hex member to prevent changes in turnbuckle length; and
   wherein the apertured end comprises a slot facilitating turnbuckle length adjustments independently of changes in the adjustable location of the mounting end.

7. The turnbuckle structure set forth in claim 6 wherein the hex member includes a flat abutting the plate member and further comprising a U-bolt securing the plate member against the flat.

8. The turnbuckle as set forth in claim 6 wherein the connector includes a bushing and the slot includes a slot edge bearing against the bushing to prevent rotation of the plate member.

9. Implement turnbuckle structure for adjusting a linkage, comprising:
   a first end;
   a second end;
   an eyebolt member threaded into the second end, the eyebolt member rotatable relative to the second end to adjust the distance between the first end and the second end over a range of distances to adjust turnbuckle length;
   a connector extending from the eyebolt member and secured to the linkage, the linkage preventing rotation of the connector;
   a planar plate member engaging the connector, the connector preventing rotation of the plate member, wherein the plate member comprises a slotted end slidingly receiving the connector and facilitating adjustments of the length between the first and second ends over a substantial portion of the range of distances; and
   means securing the plate member to the second end to prevent rotation of the eyebolt member relative to the second end and secure the adjusted distance between the first end and second end independently of additional locking hardware.

10. The turnbuckle as set forth in claim 9 wherein the means securing the plate member to the second end comprises a U-bolt connected to the plate member and extending around a hex member, the U-bolt including nut structure tightenable against the plate member.

11. The turnbuckle as set forth in claim 9 wherein the slotted end includes a slot boundary and the connector includes a bushing, the slot boundary bearing against the bushing to prevent relative rotation between the plate member and the connector.

* * * * *